United States Patent
Rangroo et al.

(10) Patent No.: US 8,503,987 B2
(45) Date of Patent: Aug. 6, 2013

(54) METHOD AND APPARATUS FOR MULTIPOINT CALL SERVICE IN MOBILE TERMINAL

(75) Inventors: Previr Rangroo, Gyeongsangbuk-do (KR); In-Hyung Jung, Gyeongsangbuk-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 13/337,424

(22) Filed: Dec. 27, 2011

(65) Prior Publication Data

US 2012/0164986 A1 Jun. 28, 2012

(30) Foreign Application Priority Data

Dec. 27, 2010 (KR) ........................ 10-2010-0135986

(51) Int. Cl.
*H04W 4/00* (2009.01)

(52) U.S. Cl.
USPC ........................ 455/412.1; 455/415; 455/416

(58) Field of Classification Search
USPC ............ 455/412.1–412.2, 414.1–414.4, 415, 455/416, 422.1, 550.1, 552.1–555, 563; 348/14.01–14.16; 379/67.1–88.28, 379/202.01–207.01
See application file for complete search history.

(56) References Cited

U.S. PATENT DOCUMENTS

| | | | |
|---|---|---|---|
| 5,710,591 A * | 1/1998 | Bruno et al. | 348/14.09 |
| 2001/0040942 A1* | 11/2001 | Glowny et al. | 379/88.22 |
| 2005/0053214 A1* | 3/2005 | Reding et al. | 379/202.01 |

FOREIGN PATENT DOCUMENTS

KR 10-2006-0105900 A 10/2006

* cited by examiner

*Primary Examiner* — Kashif Siddiqui
(74) *Attorney, Agent, or Firm* — Cha & Reiter, LLC.

(57) ABSTRACT

A mobile terminal participates in or originates a multipoint call with at least two other communication terminals connected to at least first and second call lines formed in the multipoint call. The voice data on each call line is separately recorded, or each party's voice data is separately recorded. A playback list is generated with playback selections, where each playback selection corresponds to one of the communication terminals. A user can thereby play back voice data from specific parties in the multipoint call without having to search an entire file to find the specific voice data.

18 Claims, 4 Drawing Sheets

METHOD AND APPARATUS FOR MULTIPOINT CALL SERVICE IN MOBILE TERMINAL

CLAIM OF PRIORITY

This application claims the benefit under 35 U.S.C. §119 (a) of a Korean Patent Application filed in the Korean Intellectual Property Office on Dec. 27, 2010 and assigned Serial No. 10-2010-0135986, the entire disclosure of which is hereby incorporated by reference.

BACKGROUND OF THE INVENTION

1. Field of the Invention

The present invention relates to a method and apparatus for a multipoint call service in a mobile terminal.

2. Description of the Related Art

Mobile terminals have evolved over recent years from cell phones serving a basic telephone function, to contemporary smart phones having Internet, multi-media and rich display functionality. In line with this trend, various recording/playing-related features are provided, such as a call recording/playing feature, a voice recording feature, and an automatic responding feature.

Among these features, the conventional call recording/playing feature is a general function of storing recorded audio of a call as call data in a memory within the mobile terminal, and playing back the stored call data at a future time.

Services for allowing a user to talk to several persons on his mobile terminal may be roughly classified into two types of services: a multipoint call service and a conference call service.

A conference call, as the term is used herein, is a call involving at least three parties, each using his own communication terminal with a unique phone number in a communication network. (This type of conference call is distinguished from the traditional conference call in which a group of persons may sit around a single speaker phone to speak with another party over a single communication channel.) Thus the conference call involves setting up multiple communication lines, one to each communication terminal. Typically this is done with conference bridge equipment at a server, base station or the like. In the conference call, each party receives voice signals originating from every other party throughout the call.

A multipoint call also involves at least three parties, but differs from a conference call in that the communication terminal that originated the call (the "originating" or "controlling" terminal) has the capability of activating and deactivating call lines to the various other parties. For an activated call line, the party connected thereto is free to converse with the originating terminal and with all other parties connected to activated call lines. Hence a party connected to an activated call line receives voice signals originating from the originating terminal and from all other parties with activated call lines. Typically this is accomplished with a similar network bridge at the network server. A deactivated party is essentially "put on hold" or in a suspended state, such that voice signals transmitted on the deactivated call line are not received at the originating terminal or by other parties. Depending on the services of the network/service provider, the deactivated party may still be able to receive voice signals from the originating terminal and other parties. The originating terminal also has the power to terminate other parties from the multipoint call via control signals transmitted to the network server.

With a conference call, the party initiating the call is also considered the originating or controlling terminal. The originating terminal has the power to terminate another party from the conference call. Herein, a conference call is considered a particular type of multipoint call, i.e., a multipoint call in which all parties are always connected to activated lines.

In the multipoint or conference call service, even though at least two call lines are formed and assigned to different call parties individually, calls may be recorded at the originating in a single file regardless of the call parties involved. When the user plays back the recording, in order to access the speech of a particular party, she may need to search the entire file to find it, which can be a time consuming and frustrating process.

SUMMARY OF THE INVENTION

In an aspect of the invention, a method implemented in a mobile terminal includes transmitting and receiving voice data in a multipoint call in which call lines are formed to at least two communication terminals. Communication terminal information such as a phone number is identified for each call line upon receiving a recording request signal from a user of the mobile terminal. Voice data generated in each call line is recorded separately from that of other call lines. This enables selective playback of the voice data originating from the different communication terminals during the multipoint call, in a subsequent playback mode.

In an aspect, the method determines whether the communication terminal information matches information registered in the mobile terminal corresponding to a contact in a contact list. If so, the voice data is stored in association with the contact. If no match exists, the voice data is stored in association with the communication terminal information.

In still another aspect, the recorded voice data can include voice data of the mobile terminal user in addition to voice data of another party using the communication terminal on the call line, in packet data form.

In yet another aspect, the method further includes selectively activating the call lines to form at least one activated call line and at least one deactivated call line, recording voice outputs on the at least one activated call line and temporarily ceasing recording on the at least one deactivated call line.

In another aspect, a method implemented in a mobile terminal includes: receiving first and second data packets from respective first and second communication terminals during a multipoint call between the mobile terminal and the first and second terminals, with each packet including: i) an identification item identifying the respective first or second terminal, and ii) audio data originating from the respective terminal; determining, for each data packet, whether the identification item matches that of a contact in a contact list within the mobile terminal; and storing the audio data from the first and second terminals in first and second memory portions, respectively, with each memory portion further storing: an identifier for the multipoint call; a matching contact if the identification item matches a contact; and the identification item if the identification item does not match a contact.

In an aspect, the identification item can be a telephone number of the communication terminal, and the identifier for the multipoint call can comprise date and time information. Each memory portion can be a separate audio recording file or a sub-file of a single file recording the multipoint call.

In still another aspect, a mobile terminal is configured to participate in a multipoint call with at least first and second communication terminals. The mobile terminal includes a graphical user interface including a playlist presenting at least first and second selectable playback selections corresponding to, and containing voice data originating from, the first and second communication terminals, respectively, in the multipoint call.

In an aspect, the graphical user interface can display each playback selection with a first information item identifying the multipoint call, and a second information item associated with the corresponding communication terminal. The second information item can include a contact name if the contact name is registered in the mobile terminal. Each playback selection can contain voice data originating from the corresponding communication terminal and voice data originating from the mobile terminal during at least time periods coinciding with time periods in which the voice data from the communication terminal is received.

In accordance with another aspect, there is provided an apparatus for a multipoint call service in a mobile terminal. The apparatus includes a radio communication unit for receiving information on call details from another party's communication terminal and outputting transmission signals; a controller for forming call lines to at least two communication terminals through the radio communication unit, identifying user information of a communication terminal for each call line upon receiving a recording request signal from a user while performing a call service through the formed call lines, and recording and storing voice data generated in the call line in association with the identified user information in a matching fashion; and a voice processor for converting analog voice signals received from the radio communication unit into digital signals, upon receiving a call recording command through the controller.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION

Figure 1:
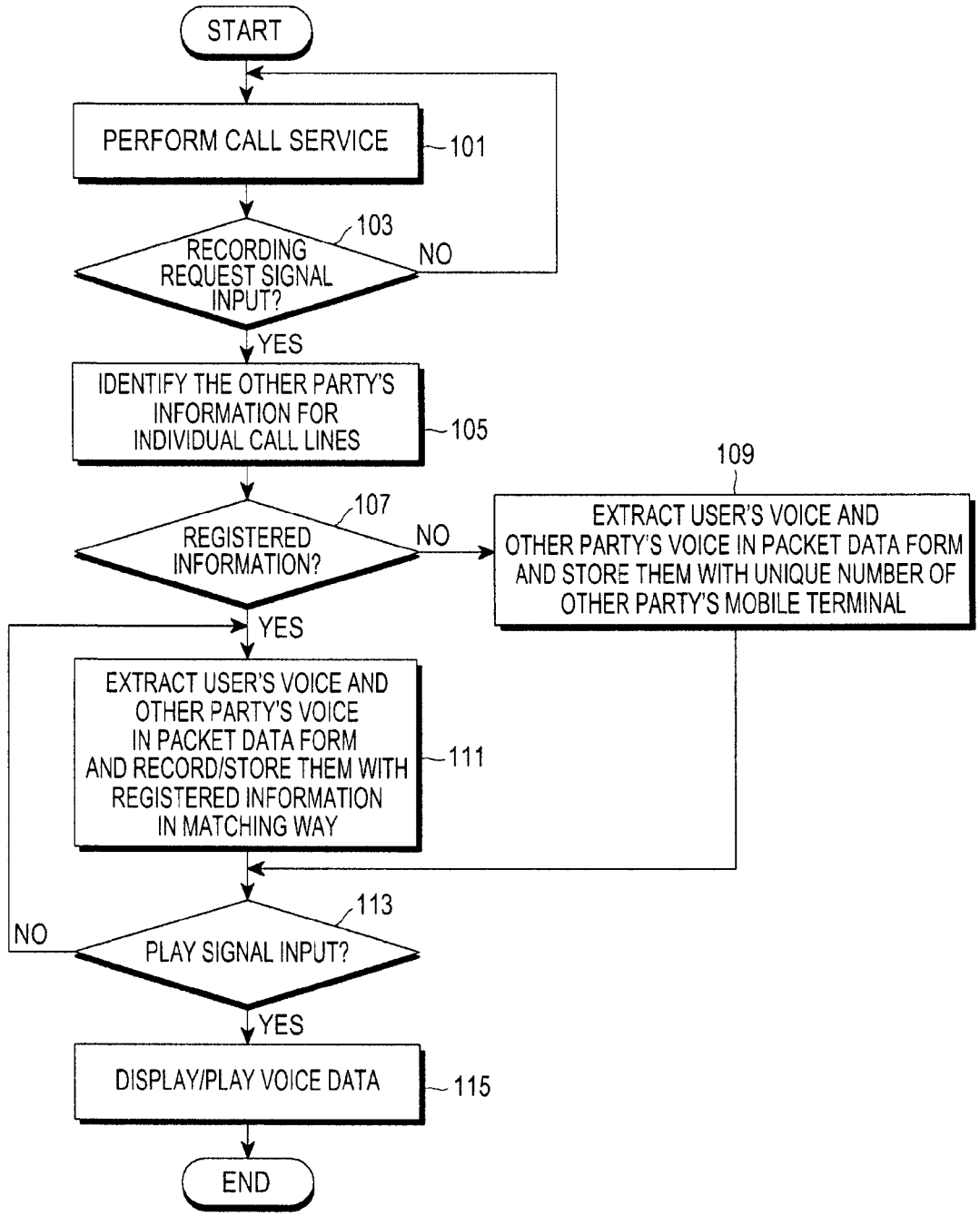
FIG. 1 illustrates a method for a multipoint call service in a mobile terminal according to an embodiment of the present invention.

Exemplary embodiments of the present invention will now be described in detail with reference to the accompanying drawings. In the following description, specific details such as detailed configuration and components are merely provided to assist the overall understanding of exemplary embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

In an aspect of the present invention, a mobile terminal participates in or originates a multipoint call with at least two other communication terminals connected to at least first and second call lines formed in the multipoint call. For each call line, the mobile terminal identifies other party's information (e.g., a phone number of the other party's communication terminal connected to the call line used by the other party) during or just prior to the multipoint call. Voice data generated in the call line is stored in association with the identified other party's information individually in a matching fashion. As an example of such matching, the other party's information can be matched to information within a contact list registered in the mobile terminal, to thereby extract the name of the other party. The voice data can then be stored in association with the extracted contact name.

In a further aspect, the mobile terminal generates a graphical user interface (GUI) including a playlist for use in a playback mode. Each playback selection is presented corresponding to a particular communication terminal and/or contact name. The GUI facilitates selective playback of the stored voice data, such that the mobile terminal user is able to playback a selective portion of the multipoint call during which a particular party spoke. With this approach, the user need not search an entire file to find speech of a desired party. The graphical user interface can be embodied so as to display each playback selection with a first information item identifying the multipoint call, and a second information item associated with the corresponding communication terminal. The second information item can include a contact name if the contact name is registered in the mobile terminal.

In a further aspect, each playback selection can contain voice data originating from the corresponding communication terminal and voice data originating from the mobile terminal during at least time periods coinciding with time periods in which the voice data from the communication terminal is received. Thus if both the mobile terminal user and another party using a first communication terminal are speaking at the same time, the voice data of both can be recorded in a playback file (or sub-file) corresponding to the playback selection of the first communication terminal.

In an implementation, voice data is extracted from data packets transmitted over the call lines. The mobile terminal receives first and second data packets from respective first and second communication terminals during a multipoint call between the mobile terminal and the first and second terminals. Each packet includes i) an identification item such as a phone number identifying the respective first or second terminal, and ii) audio data originating from the respective terminal. A mobile terminal controller/processor determines, for each data packet, whether the identification item matches that of a contact in a contact list within the mobile terminal. Audio data from the first and second terminals is stored in first and second memory portions, respectively, of a mobile terminal memory. Each memory portion can be a separate file or a sub-file of a single file generated for the multipoint call. Each memory portion further stores at least: an identifier for the multipoint call; a matching contact if the identification item matches a contact; and the identification item if the identification item does not match a contact.

The mobile terminals, to which embodiments of the present invention are applicable, may include all information/communication devices and multimedia devices capable of performing the multipoint call service, such as digital broadcasting terminals, Personal Digital Assistants (PDAs), smart phones, and $3^{rd}$ Generation (3G) terminals (e.g., International Mobile Telecommunication 2000 (IMT-2000) terminals, Wideband Code Division Multiple Access (WCDMA) terminals, Global System For Mobile communication/General Packet Radio Service (GSM/GPRS) terminals, Universal Mobile Telecommunication Service (UMTS) terminal). However, it will be understood by those of ordinary skill in the art that embodiments of the present invention described herein may be applied not only to mobile terminals, but also to fixed terminals such as digital TVs and desktop computers.

A method for a multipoint call service in a mobile terminal according to an embodiment of the present invention will be described in detail with reference to FIGS. 1, 2A and 2B.

FIG. 1 illustrates a method for a multipoint call service in a mobile terminal according to an embodiment of the present invention. FIGS. 2A and 2B illustrate examples of a multipoint call service performed in a mobile terminal according to embodiments of the present invention.

Referring to FIG. 1, the mobile terminal forms call lines to at least two communication terminals and performs a call service through the formed call lines in step 101.

The call service is a multipoint call service in which the mobile terminal communicates with at least two other parties. The mobile terminal can be the originating terminal of the multipoint call. The multipoint call can be established by means of the mobile terminal sending and receiving call setup signals. At least one of the multipoint calls may be a conference call.

In step 103, the mobile terminal checks if a recording request signal is input from a user during the multipoint call service.

Upon receiving the recording request signal, the mobile terminal identifies other party's information (e.g., a unique number of the other party's mobile or landline terminal, preferably the phone number of the other party's terminal) for each call line in step 105. The mobile terminal then checks in step 107 whether the identified unique number of the other party's mobile terminal is information registered in a phonebook (contact list) in the user's mobile terminal.

The operation in step 105 will be described in brief with reference to FIG. 2. Referring to FIG. 2A, the user forms call lines 203 and 204 to at least two communication terminals 201 and 202, respectively, by sending and receiving call setup signals using a mobile terminal 200. During this process, the mobile terminal 200 identifies and stores other party's information for the call lines 203 and 204 individually, such as the phone number of the communication terminal 201 or 202 connected to the call line 201 or 202.

Call lines 203, 204 can be formed through a communication network supporting packet communication. This implementation is illustrated in the example of FIG. 2B. Call lines 203, 204 are formed through a network 210. Mobile terminal 200 can transmit and receive packets to and from multiple communication terminals 201, 202 over a single wireless channel allocated by the network 210. Thus the portion of the call lines 203, 204 disposed between mobile terminal 200 and network 210 are actually virtual call lines carried over a single communication channel.

Communication terminal 201 transmits voice data in packets 201p-1, 201p-2, etc. over call line 203. Terminal 202 transmits voice data in packets 202p-1, 202p-2, etc. over call line 204. As illustrated, each packet such as 201p-1 contains a header portion and an audio data portion 201-d. In the example, the header portion contains unique identification information $MN_{201}$ of the communication terminal 201, which may be the phone number of terminal 201, an IP address, or other suitable number that mobile terminal 200 can use to identify it. Network 210 delivers the packets from terminals 201 and 202 to mobile terminal 200 in a suitable order. Time stamps can be included with each packet header to indicate the precise times during which the audio data was generated.

With continued reference to the process of FIG. 1, if the identified unique number is information registered in the user's mobile terminal, in step 111 the mobile terminal 200 extracts user's voice and the other party's voice in a packet data form, generated in the call line, and records and stores the extracted voice data in association with the registered information in a matching fashion in step 111.

In other words, the mobile terminal 200 determines if specific information of the other party, with which it is performing a call service, is information registered in the mobile terminal, and if so, stores the voice data in association with the registered information. This operation is illustrated in the example of FIG. 2B. A phonebook (not shown) stored within mobile terminal 200 contains an entry for phone number $MN_{202}$ corresponding to a contact by the name of Allen, who is the owner of communication terminal 202. When mobile terminal 200 receives packets from terminal 202, a controller/processor therein matches the number $MN_{202}$ included in the header with the a contact phone number stored in the phonebook to recognize that the audio data (202d-1, 202d-2, etc.) of the packets was generated by Allen. It then records the audio data in a separate memory portion 31R which can be a separate file or sub-file designated to be primarily or exclusively the voice data of Allen for the current multipoint call. For instance, along with the audio data 202d-1, 202d-2 stored in fields 227, 229, a code for Allen can be stored in field 225, the phone number $MN_{202}$ can be stored in field 223, and a date/time entry designating the date and time of the overall multipoint call can be stored in field 221. (The audio data 202d-1, etc. can include its own date/time stamps.)

In the example, phone number MN201 for communication terminal 201 is not found to match a contact in the phonebook of mobile terminal 200; hence audio data stored in a separate memory portion (file or sub-file) 30R is stored along with a "No Match' entry code in field 225 or the like. The audio data 201d-1, 201d-2 is recorded in fields 227, 229, etc., the phone number MN201 is recorded in field 223 and the same date/time entry for the multipoint call can be recorded in field 221.

Figure 2A:
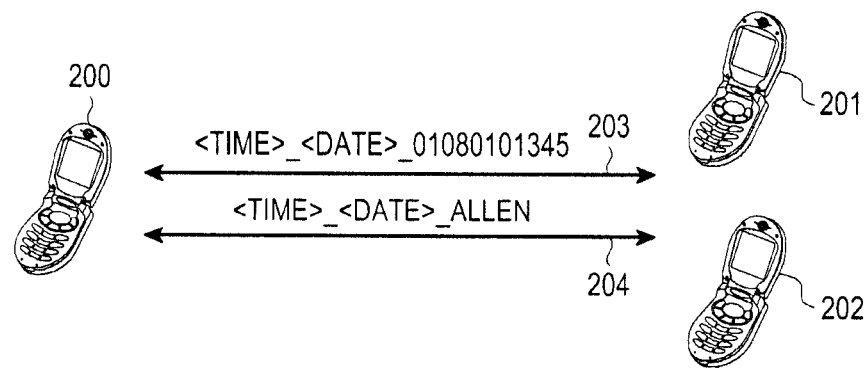
FIG. 2A illustrates an example of a multipoint call service performed in a mobile terminal according to an embodiment of the present invention.
Figure 2B:
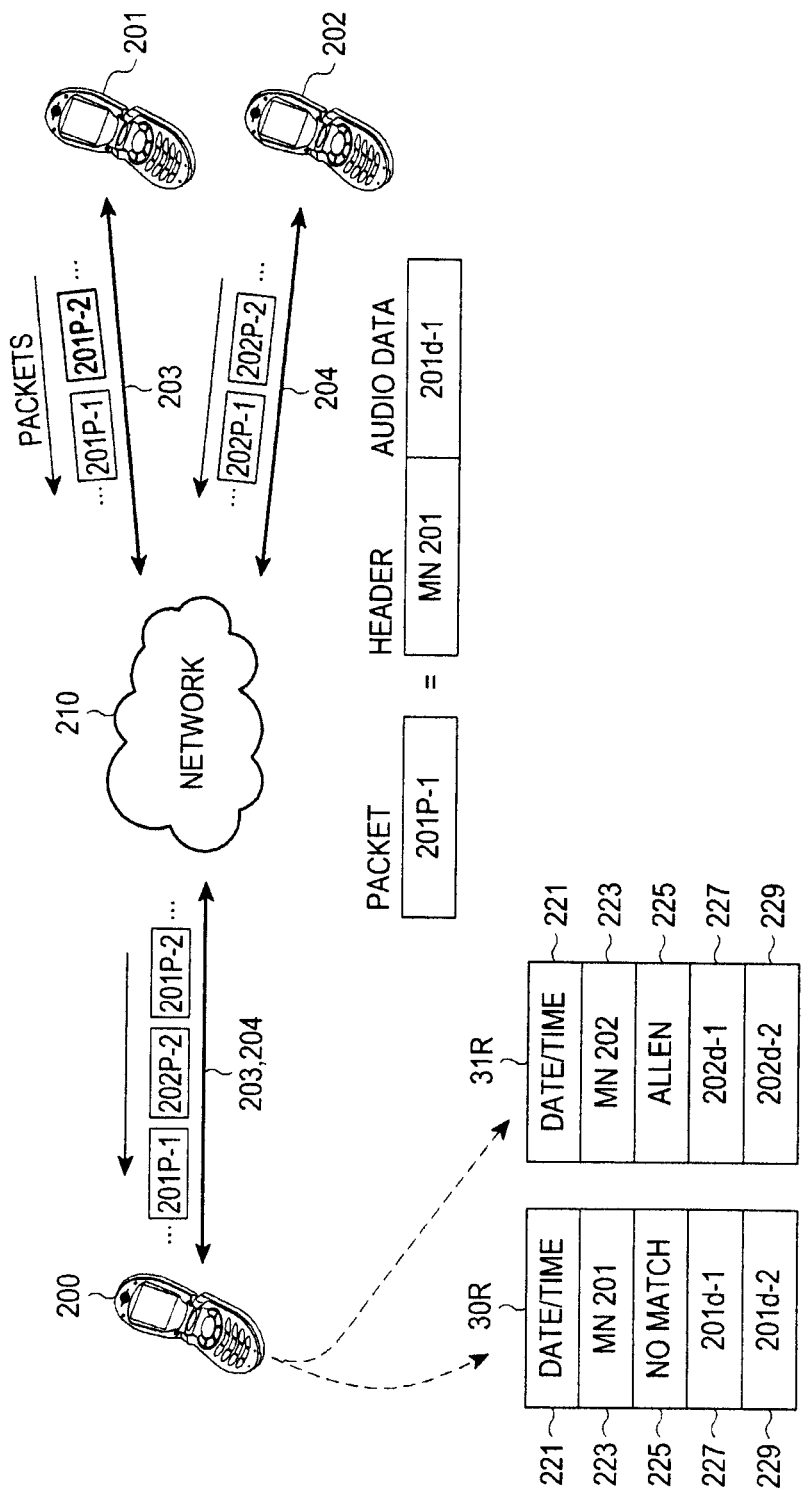
FIG. 2B illustrates a further example of a multipoint call service according to an embodiment of the invention.

In addition, although not shown in the files 30R, 31R of FIG. 2B, voice data of the mobile terminal 200 user can also be stored in these files. This storage technique can be implemented in a number of ways. As one example, only voice data of the user that overlaps that of the other party is recorded. That is, only the user's voice data that was spoken at times coinciding with the spoken times of the audio data originating from the communication terminal 201, is stored in e.g. the file 30R along with the audio data 201d-1, 201d-2, etc. This recording may allow playback, via suitable voice processing and mixing, of the user's voice together with that of the other party. As another option, the user's voice data that was spoken a predetermined time before that of the other party can also be recorded in e.g. the file 30R. The latter approach would allow the other party's voice data to be understood in the context of questions by the user, for example.

If the type of the call service is a conference call, the mobile terminal 200 can generate and store information about at least two other parties having participated in the conference call, in a single file.

As to the recording, the other party's voice outputs are recorded independently for activated call lines through which the call service is being performed, and the other party's voice outputs are not temporarily recorded for the remaining call lines except for the activated call lines. That is, since mobile terminal 200 established the multipoint call, mobile terminal 200 is the originating or controlling terminal of the multipoint call, and can selectively deactivate call lines to temporarily prevent audio from the deactivated call lines from being received by mobile terminal 200 or by any of the communication terminals connected to activated call lines.

As explained above, the matched data may include call time and date, and other party's information associated with a unique number of the other party's mobile terminal. As shown in FIG. 2A, this data can be stored in the file form of "<Time>_<Date>_other party's name," in order to facilitate playback of selected portions of the multipoint call associated with particular parties.

Figure 3:
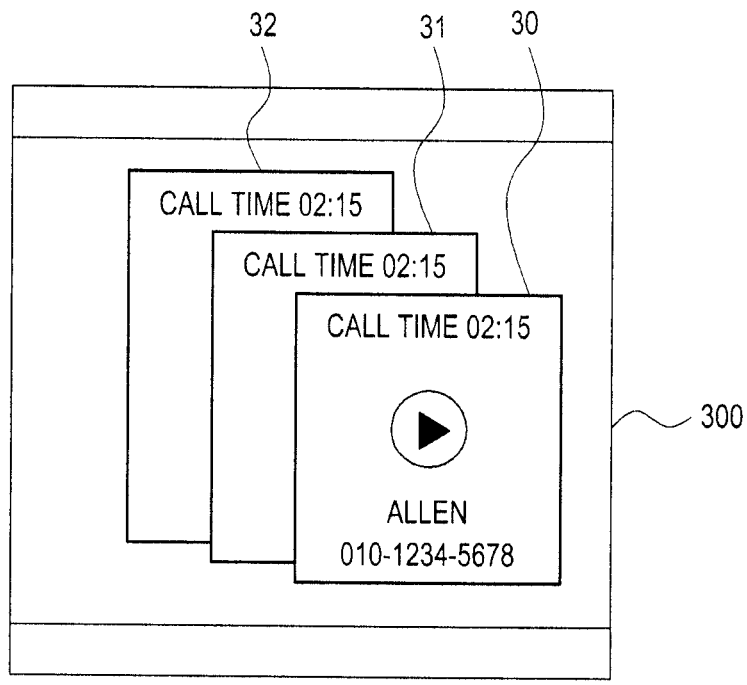
FIG. 3 illustrates an example of a mobile terminal display screen including a playlist with playback selections for portions of a multipoint call according to an embodiment of the present invention.

FIG. 3 illustrates an example of a display screen of a mobile terminal (200) including a playlist with playback selections for portions of a multipoint call according to an embodiment. In this illustrated example, a playback list is presented as a graphical user interface (GUI) with playback selections 30, 31 and 32 displayed in an overlapping layered presentation. It is understood that other presentations such as a simple list sequence, are equally possible. Each playback selection is associated with one of the communication terminals connected to a call line during the multipoint call. Playback selection 30 can be selected to play back the voice data recorded in file or sub-file 30R described above; selection 31 corresponds to file 31R, and so forth. A playback selection such as 30 can include a first information item (e.g., "Call Time 02:15") identifying the multipoint call to which the selection belongs; and a second information item (e.g. "Allen" or "010-1234-5678") identifying the communication terminal associated with the playback selection. A "play" icon is selectable by the user, e.g., via touch screen input or an input via highlighting and key stroke, to play back the audio within file or sub-file 30R.

With continued reference to FIG. 1 in conjunction with FIGS. 2A, 2B and 3, if it is checked in step 107 that the identified unique number is not information registered in the user's mobile terminal, then as explained in the examples above, the mobile terminal 200 extracts the mobile terminal 200 user's voice and other party's voice in a packet data form and stores them along with the unique number of the other party's terminal in step 109.

In step 113, the mobile terminal 200 checks if a play signal to play back a recorded call or call portion is input from the user. The user can input a play signal, e.g., via a suitable selection menu (not shown) in a graphical user interface (GUI), via a voice command, or via any other suitable means. Once a play back option is selected, the mobile terminal may present a playlist for recorded calls or call portions as shown in FIG. 3 with playback selections such as 30, 31, 32 indicating call records that can be played back.

A method for a multipoint call service in a mobile terminal according to an embodiment of the present invention has been described thus far.

Figure 4:
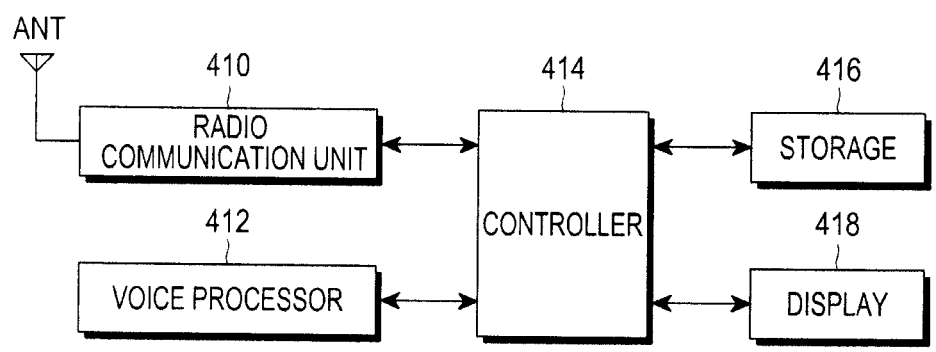
FIG. 4 illustrates a configuration of an apparatus for a multipoint call service in a mobile terminal according to an embodiment of the present invention.

An apparatus for a multipoint call service in a mobile terminal according to an embodiment of the present invention will be now described in detail with reference to FIG. 4. The apparatus includes a radio communication unit 410, a voice processor 412, a controller 414, a storage 416, and a display 418. Although not illustrated, the mobile terminal may further include a camera, a speaker, a microphone, a key input unit, etc.

The radio communication unit 410 receives information on call details from the other party's mobile terminal and outputs desired transmission signals.

The radio communication unit 410 outputs, to the controller 414, downlink data obtained by receiving radio downlink signals from the air using an antenna ANT and demodulating the radio downlink signals. The radio communication unit 410 generates radio uplink signals by modulating uplink data received from the controller 414, and wirelessly transmits the generated radio uplink signals to the air using the antenna ANT. Preferably, the modulation and demodulation may be performed by Code Division Multiple Access (CDMA), and may also be performed by Frequency Division Multiplexing (FDM) and/or Time Division Multiplexing (TDM).

Upon receiving a call recording command through the controller 414, the voice processor 412 converts analog voice signals received from the radio communication unit 410 into digital signals. Alternatively, voice processor 412 extracts audio data from incoming data packets and stores these directly as digital signals without conversion from analog.

The controller (also referred to herein interchangeably as a processor) 414 forms call lines to at least two communication terminals through the radio communication unit 410, identifies user information of a communication terminal for each call line upon receiving a recording request signal from the user while performing a call service through the formed call line, records voice data generated in the call line along with the identified user information in association with a matched contact, if any, and controls the recorded voice data.

The controller 414 determines if specific information of the other party, with which it is performing a call service, is information registered in the mobile terminal. If so, the controller 414 stores the voice data in association with the registered information, and if not so, the controller 414 stores a unique number of the other party's mobile terminal.

Upon receiving a recording request signal, the controller 414 records voice outputs of the other parties independently for activated call lines through which a call service is being performed, and temporarily stops recording voice outputs of the other parties for the remaining call lines except for the activated call lines while performing the recording.

Upon receiving a play signal command from the user, the controller 414 receives, from the user, information about the other party whose voice data is to be played, identifies other party's information for each call line, extracts the received other party's information from data to which voice data is matched, and plays the extracted data.

If the type of the call service is a conference call, the controller 414 generates and stores information about at least two other parties having participated in the conference call, in a single file.

The storage 416, in which programs for handling and controlling the controller 414 are stored, stores the data recorded in association with voice data generated in each call line, in association with identified user information for the call line as described in accordance with an embodiment of the present invention, and also stores input/output data (e.g., phonebook data, messages, media player data, network data, etc.).

Upon receiving a play request from the user, the display 418, under control of the controller 414, displays a plurality of playback selections as 30, 31, 32 by matching voice data to other party's information generated for each call line.

As is apparent from the foregoing description, the present invention provides a method and apparatus for identifying other party's information for each call line, recording/storing voice data generated in the call line in the identified other party's information individually in a matching fashion, and selectively playing/displaying the recorded voice data in a mobile terminal that may form call lines to at least two communication terminals and perform a call service through the formed call lines, thereby rendering it possible to prevent the user from inconveniently playing the entire file to search for recorded calls of only a specific call party.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method implemented in a mobile terminal, comprising:
   transmitting and receiving voice data in a multipoint call in which call lines are formed to at least two communication terminals;
   receiving a recording request signal from a user of the mobile terminal;
   identifying communication terminal information for each call line; and
   for each call line, recording voice data generated in the call line separately from that of other call lines, to enable selective playback thereof in a playback mode,
   wherein the voice data includes voice data of the user of the mobile terminal and voice data of another party using the communication terminal on the call line, in packet data form.

2. The method of claim 1, wherein the recording comprises determining whether the communication terminal information matches information registered in the mobile terminal corresponding to a contact in a contact list, and if so, storing the voice data in association with the contact, and otherwise storing the voice data in association with the communication terminal information.

3. The method of claim 1, wherein the multipoint call is established with the at least two communication terminals by sending and receiving call setup signals.

4. The method of claim 1, wherein the recording comprises recording voice outputs of other parties independently for activated call lines of the formed call lines.

5. The method of claim 4, further comprising selectively activating the call lines to form at least one activated call line and at least one deactivated call line, recording voice outputs on the at least one activated call line and temporarily ceasing recording on the at least one deactivated call line.

6. The method of claim 1, further comprising:
   generating a playlist for the multipoint call containing a plurality of playback selections, each playback selection corresponding to the first or second communication terminal and containing voice data originating from at least the corresponding communication terminal.

7. The method of claim 1, wherein the storing comprises, if a type of the call service is a conference call, generating and storing information about at least two other parties having participated in the conference call, in a single file.

8. An apparatus for a multipoint call service in a mobile terminal, comprising:
   a radio communication unit for receiving information on call details from another party's communication terminal and outputting transmission signals;
   a controller for forming call lines to at least two communication terminals through the radio communication unit, identifying user information of a communication terminal for each call line, receiving a recording request signal from a user while performing a call service through the formed call lines, and recording and storing voice data generated in the call line in association with the identified user information in a matching fashion; and
   a voice processor for converting analog voice signals received from the radio communication unit into digital signals, upon receiving a call recording command through the controller,
   wherein the voice data includes voice data of a user of the mobile terminal and voice data of another party using one of the communication terminals on the call line, in packet data form.

9. The apparatus of claim 8, wherein the controller determines whether specific information of the another party, with which the mobile terminal is performing a call service, is information registered in the mobile terminal, stores the voice data in association with the registered information if the specific information is the registered information, and stores the voice data along with a unique number of the another party's communication terminal if the specific information is not the registered information.

10. The apparatus of claim 8, wherein the controller records voice outputs of other parties independently for activated call lines through which the call service is being performed, upon receiving a recording request signal, and temporarily stops recording voice outputs of the other parties for remaining call lines except for the activated call lines while performing the recording.

11. The apparatus of claim 8, wherein the controller further generates a playlist for the multipoint call containing a plurality of playback selections, each playback selection corresponding to the first or second communication terminal and containing voice data originating from at least the corresponding communication terminal.

12. The apparatus of claim 8, wherein if a type of the call service is a conference call, the controller generates and stores information about at least two other parties having participated in the conference call, in a single file.

13. A method implemented in a mobile terminal, comprising:
   receiving first and second data packets from respective first and second communication terminals during a multipoint call between the mobile terminal and the first and second terminals, each packet including: i) an identification item identifying the respective first or second terminal, and ii) audio data originating from the respective terminal;
   determining, for each data packet, whether the identification item matches that of a contact in a contact list within the mobile terminal; and storing the audio data from the first and second terminals in first and second memory portions, respectively, with each memory portion further storing: an identifier for the multipoint call; a matching contact if the identification item matches a contact; and the identification item if the identification item does not match a contact.

14. The method of claim 13 wherein the identification item is a telephone number of the communication terminal.

15. The method of claim 13 wherein the identifier for the multipoint call comprises date and time information.

16. The method of claim 13 wherein each memory portion is a separate audio recording file or a sub-file of a single file recording the multipoint call.

17. A mobile terminal configured to participate in a multipoint call with at least first and second communication terminals, the mobile terminal comprising:

a graphical user interface including a playlist presenting at least first and second playback selections corresponding to, and containing voice data originating from, the first and second communication terminals, respectively, in the multipoint call, wherein the graphical user interface displays each playback selection with a first information item identifying the multipoint call, and a second information item associated with the corresponding communication terminal, the second information item including a contact name if the contact name is registered in the mobile terminal.

18. The mobile terminal of claim 17, wherein each playback selection contains voice data originating from the corresponding communication terminal and voice data originating from the mobile terminal during at least time periods coinciding with time periods in which the voice data from the communication terminal is received.

\* \* \* \* \*